United States Patent
Bae et al.

(10) Patent No.: US 7,211,344 B2
(45) Date of Patent: May 1, 2007

(54) FUEL CELL SYSTEMS

(75) Inventors: In Tae Bae, Wrentham, MA (US); Andrew G. Gilicinski, Westborough, MA (US)

(73) Assignee: The Gillette Company, Boston, MA (US)

(*) Notice: Subject to any disclaimer, the term of this patent is extended or adjusted under 35 U.S.C. 154(b) by 339 days.

(21) Appl. No.: 10/438,031

(22) Filed: May 14, 2003

(65) Prior Publication Data
US 2004/0229094 A1   Nov. 18, 2004

(51) Int. Cl.
*H01M 8/04* (2006.01)
*H01M 4/94* (2006.01)

(52) U.S. Cl. .............. 429/13; 429/34; 429/44

(58) Field of Classification Search .......... 429/13, 429/17, 34, 44
See application file for complete search history.

(56) References Cited

U.S. PATENT DOCUMENTS

| | | | | |
|---|---|---|---|---|
| 3,679,486 A * | 7/1972 | Proell | ............ | 429/13 |
| 3,893,870 A | 7/1975 | Kozawa | ............ | 429/57 |
| 4,751,151 A | 6/1988 | Healy et al. | ............ | 429/17 |
| 5,223,102 A | 6/1993 | Fedkiw, Jr. et al. | ............ | 204/78 |
| 5,573,866 A | 11/1996 | Van Dine et al. | ............ | 429/13 |
| 5,605,770 A * | 2/1997 | Andreoli et al. | ............ | 429/20 |
| 5,769,389 A * | 6/1998 | Jacobsen et al. | ............ | 251/129.06 |
| 5,837,158 A | 11/1998 | Shepodd et al. | ............ | 252/181.6 |
| 5,845,485 A | 12/1998 | Murphy et al. | ............ | 60/274 |
| 6,333,123 B1 | 12/2001 | Davis et al. | ............ | 429/87 |
| 6,358,637 B1 * | 3/2002 | Fuss | ............ | 429/12 |
| 6,365,289 B1 * | 4/2002 | Lee et al. | ............ | 429/13 |
| 6,365,294 B1 * | 4/2002 | Pintauro et al. | ............ | 429/33 |
| 6,368,476 B1 * | 4/2002 | DeMarinis et al. | ............ | 429/44 X |
| 6,368,737 B1 * | 4/2002 | Margiott et al. | ............ | 429/13 |
| 6,428,922 B2 | 8/2002 | Bailey | ............ | 429/57 |
| 6,460,733 B2 | 10/2002 | Acker et al. | ............ | 222/94 |
| 6,500,576 B1 | 12/2002 | Davis et al. | ............ | 429/27 |
| 6,514,634 B1 | 2/2003 | Rush, Jr. | ............ | 429/17 |
| 6,514,635 B2 | 2/2003 | Van Dine et al. | ............ | 429/17 |
| 6,916,563 B2 * | 7/2005 | Yamamoto et al. | ............ | 429/17 |
| 6,921,594 B2 * | 7/2005 | Huang et al. | ............ | 429/13 X |
| 2002/0039674 A1 * | 4/2002 | Suzuki et al. | ............ | 429/34 X |
| 2002/0076588 A1 | 6/2002 | Singh et al. | ............ | 429/20 |
| 2002/0160241 A1 | 10/2002 | Huang | ............ | 429/19 |

(Continued)

FOREIGN PATENT DOCUMENTS

DE   101 07 529 A1   9/2002

(Continued)

OTHER PUBLICATIONS

Williford et al., "A combined passive water vapor exchanger and exhaust gas diffusion barrier for fuel cell applications", *Journal of Power Sources* 112:570-576 (2002), no month.

(Continued)

*Primary Examiner*—Stephen J. Kalafut
(74) *Attorney, Agent, or Firm*—Fish & Richardson P.C.

(57) ABSTRACT

Fuel cell systems and methods of operating fuel cell systems are disclosed. In some embodiments, the systems and methods include an emission control system that reduces an amount of organic emission(s) released from the fuel cell systems. The organic emission(s) can include, for example, methanol, formic acid, and/or formaldehyde.

44 Claims, 4 Drawing Sheets

U.S. PATENT DOCUMENTS

2003/0007912 A1    1/2003    Silver ..................... 422/211

FOREIGN PATENT DOCUMENTS

| JP | 56097972 | 8/1981 |
| JP | 08148151 | 6/1996 |
| JP | 2003 1313059 | 11/2001 |
| JP | 2002-372303 | 12/2002 |
| JP | 2003 346862 | 12/2003 |
| WO | WO 02/15306 A2 | 2/2002 |
| WO | WO 03/047010 A2 | 6/2003 |
| WO | WO 2004/055930 A2 | 7/2004 |

OTHER PUBLICATIONS

Liu et al., "Partial Oxidation of Methanol on a Metallized Nafion Polymer Electrolyte-Membrane", *J. Electrochem. Soc.* 12:3514-3523 (1992), (Dec.).

Bae, I., "IR-ATR Spectroscopy for methanol electro-oxidation," Excerpt from 3rd Quarterly Report and Annual Report 1994, no month.

* cited by examiner

FUEL CELL SYSTEMS

FIELD OF THE INVENTION

The invention relates to fuel cell systems and methods of operating the systems.

BACKGROUND

A fuel cell is a device capable of providing electrical energy from an electrochemical reaction, typically between two or more reactants. Generally, a fuel cell includes two electrodes, called an anode and a cathode, and a solid electrolyte disposed between the electrodes. The anode contains an anode catalyst, and the cathode contains a cathode catalyst. The electrolyte, such as a solid membrane electrolyte, is typically ionically conducting but electronically non-conducting. The electrodes and solid electrolyte can be disposed between two gas diffusion layers (GDLs).

During operation of the fuel cell, the reactants are introduced to the appropriate electrodes. At the anode, the reactant(s) (the anode reactant(s)) interacts with the anode catalyst and forms reaction intermediates, such as ions and electrons. The ionic reaction intermediates can flow from the anode, through the electrolyte, and to the cathode. The electrons, however, flow from the anode to the cathode through an external load electrically connecting the anode and the cathode. As electrons flow through the external load, electrical energy is provided. At the cathode, the cathode catalyst interacts with the other reactant(s) (the cathode reactant(s)), the intermediates formed at the anode, and the electrons to complete the fuel cell reaction.

For example, in one type of fuel cell, sometimes called a direct methanol fuel cell (DMFC), the anode reactants include methanol and water, and the cathode reactant includes oxygen (e.g., from air). At the anode, methanol is oxidized; and at the cathode, oxygen is reduced:

$$CH_3OH + H_2O \rightarrow CO_2 + 6H^+ + 6e^- \qquad (1)$$

$$\tfrac{3}{2}O_2 + 6H^+ + 6e^- \rightarrow 3H_2O \qquad (2)$$

$$CH_3OH + \tfrac{3}{2}O_2 \rightarrow CO_2 + 2H_2O \qquad (3)$$

As shown in Equation (1), oxidation of methanol produces carbon dioxide, protons, and electrons. The protons flow from the anode, through the electrolyte, and to the cathode. The electrons flow from the anode to the cathode through an external load, thereby providing electrical energy. At the cathode, the protons and the electrons react with oxygen to form water (Equation 2). Equation 3 shows the overall fuel cell reaction.

SUMMARY

The invention relates to fuel cell systems and methods of operating the systems.

In one aspect, the invention features fuel cell systems having reduced emissions of certain materials, and methods of operating the systems that are capable of reducing the emissions from the fuel cell systems. In some fuel cell systems, such as direct methanol fuel cell systems, certain organic materials can be produced. These organic materials, for example, methanol, formic acid, and/or formaldehyde, can be hazardous if they are released into the environment. By reducing the emissions of the materials, the health and safety risks posed by the materials can be reduced.

In another aspect, the invention features a fuel cell system including an outlet, a fuel cell stack in fluid communication with the outlet, an organic fuel in fluid communication with the fuel cell stack, and an emission control system in fluid communication with the outlet. The control system is capable of reducing an amount of an organic emission from the outlet. The organic emission can include methanol, formic acid, and/or formaldehyde.

Embodiments may include one or more of the following features. The outlet is an anode outlet and/or a cathode outlet. The emission control system includes a packed bed, such as one having activated carbon, potassium permanganate, elumine, or lanthanum oxide. The emission control system includes a substrate and a first material dispersed on the substrate, and the first material is capable of reducing the amount of the organic emission. The first material can include activated carbon, potassium permanganate, elumine, and/or lanthanum oxide. The organic fuel and the emission control system are components of a modular system.

The fuel cell system can further include a mechanism adapted to restrict gas flow to the fuel cell stack, e.g., through an outlet, and/or through an inlet in fluid communication with the fuel cell stack. The mechanism can include a pressure-sensitive valve, such as a slit valve. Alternatively or in addition, the mechanism can include a shape memory material.

The organic fuel can include an alcohol, such as methanol.

The fuel cell stack can include a fuel cell having a gas diffusion layer having a first material capable of reducing an amount of the organic emission that contacts the first material. The first material can include platinum, palladium, and/or ruthenium.

In another aspect, the invention features a fuel cell system, comprising a fuel cell including a gas diffusion layer having dispersed therein a first material capable of reducing an amount of an organic emission that contacts the first material.

Embodiments may include one or more of the following features. The first material is dispersed in the gas diffusion layer at less than about 0.1 mg/cm$^2$, e.g., less than about 0.05 mg/cm$^2$, or less than about 0.01 mg/cm$^2$. The first material can include platinum, palladium, or ruthenium. The first material can include an oxide, such as platinum oxide, ruthenium oxide, manganese oxide, or chromium oxide. The organic emission can be methanol, formic acid, and/or formaldehyde.

In another aspect, the invention features a fuel cell system including a fuel cell stack including a cathode catalyst and a passageway in fluid communication with the cathode catalyst, and a mechanism adapted to restrict gas flow through passageway.

Embodiments may include one or more of the following features. The passageway is a cathode inlet. The passageway is a cathode outlet. The mechanism includes a pressure-sensitive valve, such as a slit valve. The mechanism includes a shape memory material.

In another aspect, the invention features a method of operating a fuel cell system. The method includes contacting an organic fuel to a catalyst of a fuel cell in the fuel cell system, and reducing an amount of an organic emission from an outlet of the fuel cell system.

Embodiments may include one or more of the following features. Contacting emission from the outlet with a first material, such as carbon, capable of reducing an amount of methanol, formic acid, and/or formaldehyde from the outlet. The outlet is an anode outlet, wherein emission from the anode outlet includes methanol, and further including introducing the methanol from the anode outlet to the fuel cell. The outlet is a cathode outlet. The organic emission can include methanol, formic acid, and/or formaldehyde. The organic fuel can include an alcohol, such as methanol.

The method further can include contacting the organic emission with a first material dispersed in a gas diffusion layer of the fuel cell, and the first material is capable of reducing an amount of the organic emission. The first material can include platinum, palladium, ruthenium, and/or an oxide.

In another aspect, the invention features a method of operating a fuel cell system, including deactivating the fuel cell system, and reducing gas flow to the fuel cell system.

Reducing gas flow can include activating a mechanism including a shape memory material, and/or is performed after the fuel cell system is deactivated. Reducing gas flow can be through a cathode inlet of the fuel cell system, and/or through a cathode outlet of the fuel cell system. Reducing gas flow can include restricting a passageway with a pressure-sensitive valve.

Other aspects, features, and advantages of the invention will be apparent from the drawing, description, and claims.

DETAILED DESCRIPTION OF THE PREFERRED EMBODIMENTS

Figure 1:
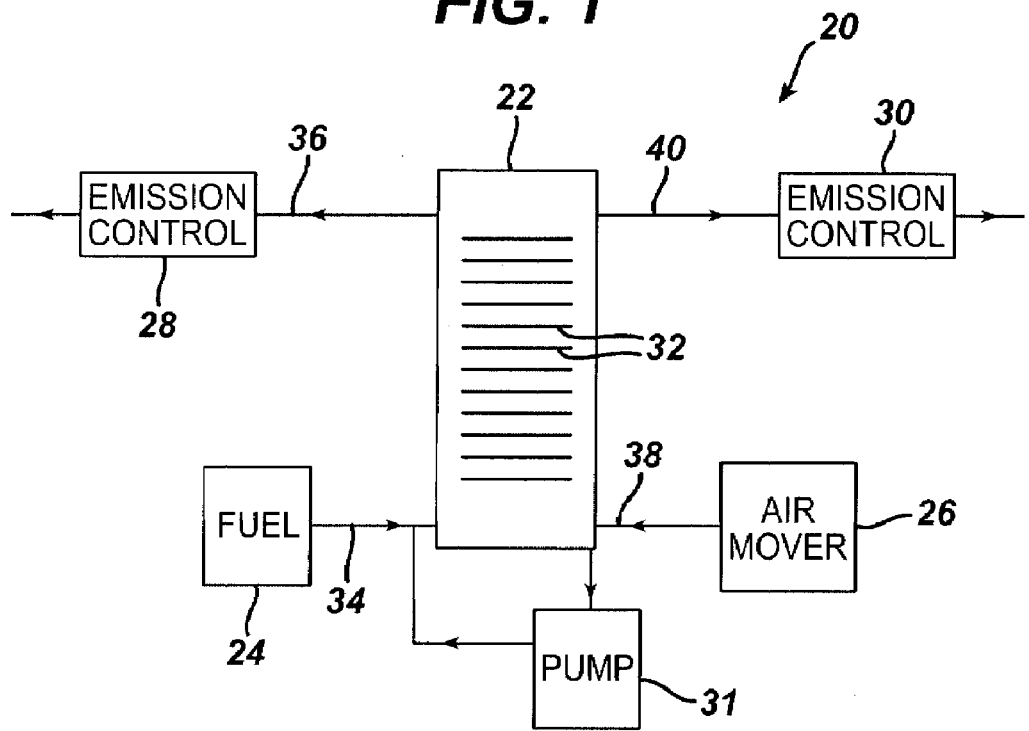
FIG. 1 is a schematic diagram of an embodiment of a fuel cell system.

Referring to FIG. 1, an organic fuel cell system 20, such as, a direct methanol fuel cell (DMFC) system, is shown. System 20 includes a fuel cell stack 22, a fuel source 24 (e.g., a methanol cartridge), an air mover 26 (e.g., a fan or a blower), two emission control systems 28 and 30, and a pump 31. Fuel cell stack 22 can have one fuel cell 32 (described below) or a plurality of fuel cells 32, e.g., arranged in series or in parallel. Fuel source 24 is in fluid communication with fuel cell stack 22 via an anode inlet 34, and emission control system 28 is in fluid communication with the fuel cell stack via an anode outlet 36. Air mover 26 is in fluid communication with fuel cell stack 22 via a cathode inlet 38, and emission control system 30 is in fluid communication with the fuel cell stack via a cathode outlet 40. Pump 31 can deliver water from stack 22 to anode inlet 34 (e.g., for Reaction 1 above). As described below, emission control systems 28 and 30 are capable of decreasing (e.g., eliminating) the amount of organic emissions that can be produced by fuel cell system 20. Certain organic emissions, such as formaldehyde, can be hazardous, so by reducing the amount of organic emissions, the health and safety risks posed by the operation of fuel cell system 20 can be reduced.

Without wishing to be bound by theory, in a direct methanol fuel cell system, the organic emissions can be generated by incomplete oxidation of methanol. During operation of fuel cell system 20, methanol from fuel source 24 and water are introduced via inlet 34 to contact an anode of fuel cell(s) 32 in stack 22. Under complete oxidation, the methanol is oxidized to form a number of intermediates (such as formaldehyde (HCHO) and formic acid (HCOOH)) that are further oxidized to form carbon dioxide as a final reaction product, which is released to the environment through anode outlet 36 (Reaction 1). The carbon dioxide produced at the anode can also diffuse to the cathode and be released to the environment through cathode outlet 40. However, under certain operating conditions, the methanol is not completely oxidized. As a result, the intermediates can flow through anode outlet 36 and be released into the environment as organic emissions.

Furthermore, in some cases, methanol can diffuse through the electrolyte and to the cathode of fuel cell(s) 32. At the cathode, the methanol can react with oxygen introduced via inlet 38 by air mover 26. The methanol and oxygen can react to form the intermediates, which can then flow through cathode outlet 40 and be released into the environment as organic emissions. Moreover, unreacted methanol can also be released through anode outlet 36 and/or cathode outlet 40. Thus, under some conditions, operation of a fuel cell system, such as a DMFC, can produce organic emissions, such as formaldehyde, formic acid, and/or methanol, into the environment.

Emission control systems 28 and 30 are adapted to decrease (e.g., eliminate) the amount of organic emissions released into the environment from a fuel cell system. As described below, a number of embodiments of emission control systems 28 and 30 can be used. Emission control systems 28 and 30 can be the substantially identical embodiment, or the systems can be different embodiments, in any combination. In some embodiments, fuel cell system 20 includes one emission control system. The single emission control can be in fluid communication with anode outlet 36, with cathode outlet 40, or with both outlets 36 and 40 in embodiments in which the outlets are combined. The description of emission control system 28 below also applies to emission control system 30.

Figure 2:
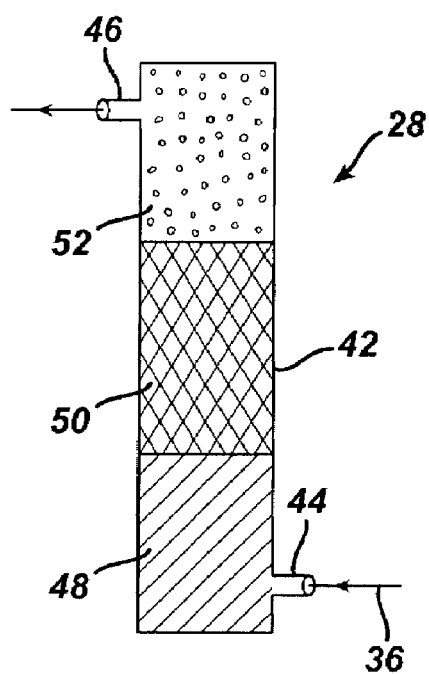
FIG. 2 is a schematic diagram of an embodiment of an emission control system.

Referring to FIG. 2, in some embodiments, emission control system 28 has the form of a packed bed tube 42. Packed bed tube 42 has an inlet 44 that can be placed in fluid communication with anode outlet 36, and an outlet 46 that can be, for example, vented to the environment. As shown, packed bed tube 42 contains three materials 48, 50, and 52 capable of decreasing the amount of organic emissions that flow from anode outlet 36 and through the bed tube. For example, material 48 can decrease methanol; material 50 can decrease formaldehyde; and material 52 can decrease formic acid.

Materials 48, 50, and 52 can decrease organic emissions through any mechanism(s). For example, the mechanism(s) can include absorption, adsorption, catalysis, and/or reaction (e.g., decomposition) with the emissions. Examples of materials that can reduce emission gases by absorption/adsorption include reactive and/or porous materials with high surface area, such as aluminosilicates, zeolites, active carbon, or carbon black. Examples of materials that can reduce emission gases by reaction (e.g., oxidation and/or neutralization) include alkali and alkaline earth oxides; lanthanum oxide; inorganic and organic salts of permanganate, dichromate, and ruthenate; peroxides; chlorates; chlorites; hypochlorites; and oxides of transition metals, such as Cu, Co, Cr, Fe, Ag, and Mn. Examples of materials that can reduce emission gases by catalysis (e.g., decomposition and/or oxidation) include metals, such as Pt, Pd, Ni, Ru, Ir, Os, Ag, Au, Cu, Fe, Cr, Co, Mn, Ti, and their oxides. A specific example of a material that can decrease methanol includes activated carbon. Examples of materials that can decrease formaldehyde include potassium permanganate and elumine, or FORMASORB™ (available from Nucon Int'l, Inc. (Columbus, Ohio)). Examples of materials that can decrease formic acid include a basic material, such as lanthanum oxide or impregnated activated carbon.

Other embodiments are possible. For example, materials 48, 50, and/or 52 can be supported on a granular porous medium, such as an inert oxide, e.g., aluminum oxide or zirconium oxide. Materials 48, 50, and/or 52 can be placed in tube 42 as discrete portions or layers in any sequence or staging along the tube. More than one layer of each material can be used. In some embodiments, materials 48, 50, and 52 are mixed together within tube 42. Packed bed tube 42 can include fewer than three materials, e.g., two or one material. For example, packed bed tube 42 can include materials that can decrease formaldehyde and formic acid. Any amount of methanol that flows through tube 42 is not decreased and can be, for example, recycled from outlet 46 to anode inlet 34.

Figure 3:
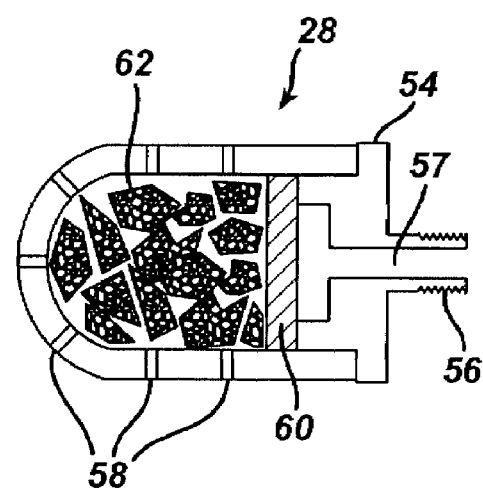
FIG. 3 is a schematic diagram of an embodiment of an emission control system.

Referring to FIG. 3, in other embodiments, emission control system 28 has a housing 54 in a form based on the principle of a catalytic converter. As shown, housing 54 has an inlet 56 configured to engage with anode outlet 36 or fuel cell stack 22, a passageway 57, and a plurality of vents 58 that serve as outlets. Within housing 54, system 28 includes a filter 60 (e.g., a porous material) that allows emissions to flow through, and one or more materials 62 that can decrease organic emissions. Materials 62 (including their arrangement within housing 54) can be the same as materials 48, 50, and/or 52 described above.

Figure 4:
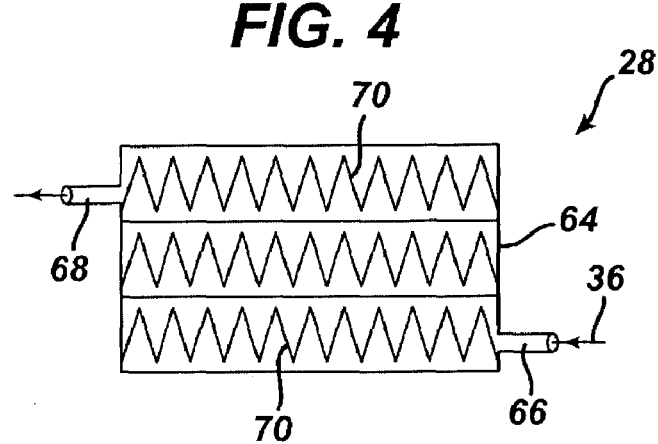
FIG. 4 is a schematic diagram of an embodiment of an emission control system.
Figure 5:
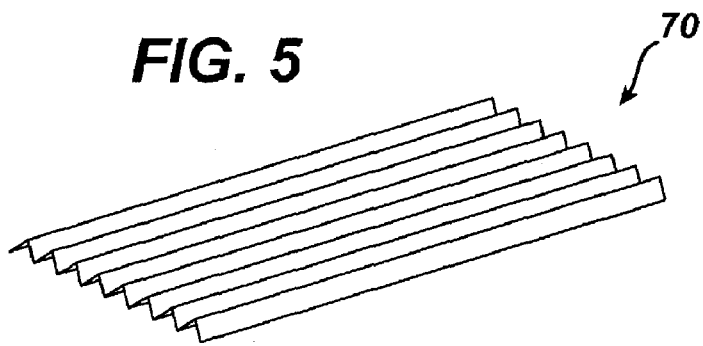
FIG. 5 is an illustration of an embodiment of a substrate.

FIGS. 4 and 5 show another embodiment of emission control system 28. As shown, system 28 includes a housing 64 having an inlet 66 capable of being in fluid communication with anode outlet 36, and an outlet 68. Within housing 64, system 28 includes one or more substrates 70 that can be impregnated or dispersed with one or more materials 48, 50, and/or 52 that can decrease organic emissions. Substrate 70 can be, for example, corrugated filter paper to provide a large surface area to increase the occurrence of contact between emission materials and materials 48, 50, and/or 52.

In operation, any one or more of the embodiments of the emission control systems described herein (e.g., FIGS. 2–5) can be used for system 28 and/or 30. On the anode side, water and a fuel (such as methanol) are introduced to fuel cell stack 22 to be oxidized to form electrons, protons, and carbon dioxide. The carbon dioxide, along with any unreacted fuel and products of partial oxidation (e.g., formaldehyde and/or formic acid), are passed through anode outlet 36 and into emission control system 28. System 28 can reduce the amount of products of partial oxidation and/or unreacted fuel released into the environment. On the cathode side, oxygen (e.g., from air) is introduced to fuel cell stack 22 by air mover 26. The oxygen reacts with the electrons and protons to form water, which can be delivered to anode inlet 34 via pump 31. The oxygen can also react with (e.g., oxidized) methanol that has diffused from the anode side to the cathode. The oxidation can produce products of partial oxidation, which, along with any unreacted methanol, are passed through cathode outlet 40 and into emission control system 30. System 30 can reduce the amount of products of partial oxidation and/or unreacted fuel released into the environment.

Still other embodiments of emission control systems are possible.

Figure 6A:
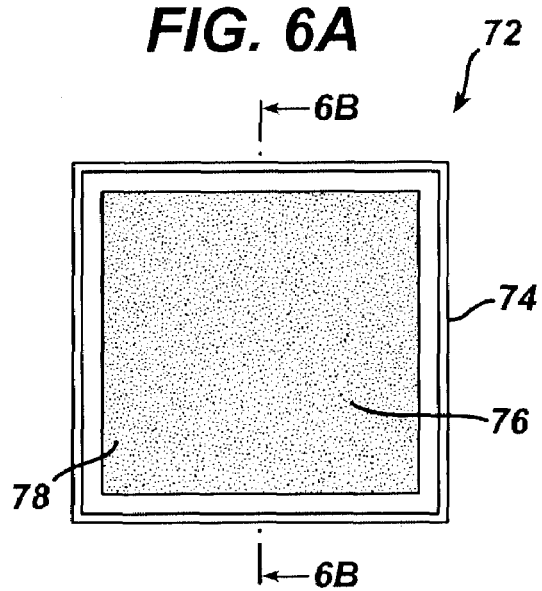
FIG. 6A is an elevational view of an embodiment of an emission control system.
Figure 6B:
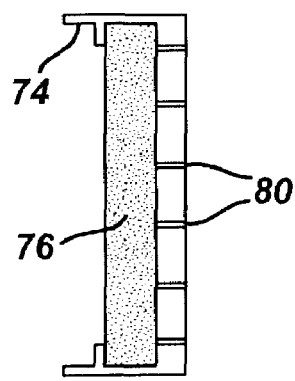
FIG. 6B is a cross-sectional view of the emission control system of FIG. 6A, taken along line 6B—6B.

For example, in some fuel cell systems, no air mover is used, and air flow is governed by diffusion. FIGS. 6A and 6B show an emission control system 72 having the form of a frame 74 that can engage with a cathode side of a fuel cell stack. Frame 74 includes a filter 76 that can be loaded or impregnated with and one or more materials 78 that can decrease organic emissions. The area of filter 76 can correspond to the exposed surface area of the cathode catalyst in the fuel cell stack. Material(s) 78 can be the same as materials 48, 50, and/or 52 described above. Frame 74 further includes a plurality of openings 80 that serve both as cathode inlets and cathode outlets (i.e., there is no distinction between the cathode inlets and the cathode outlets).

Figure 7:
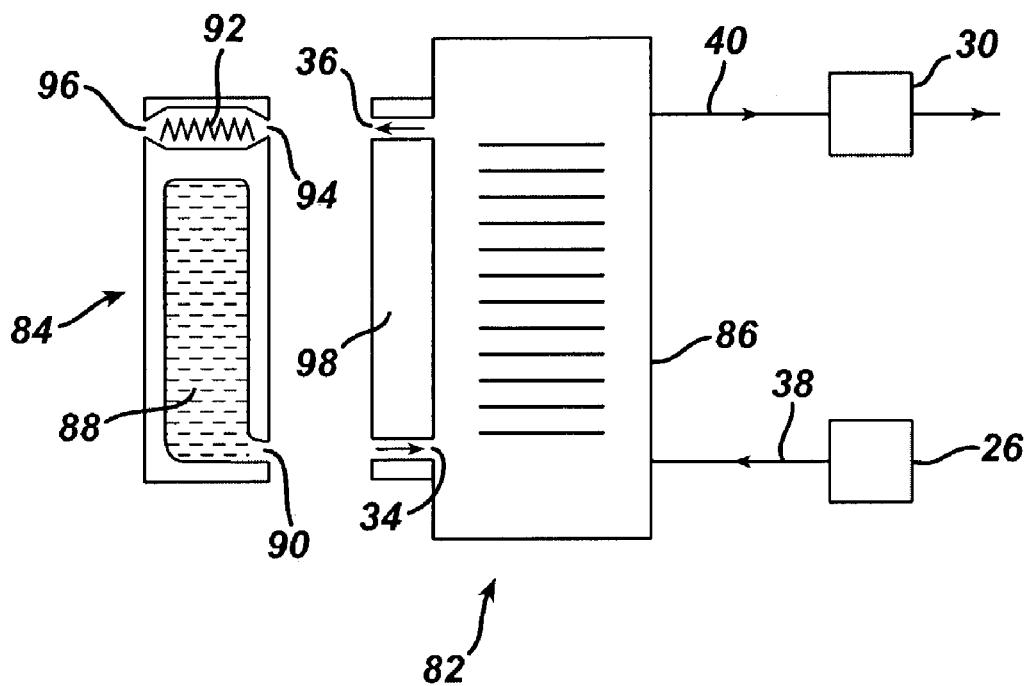
FIG. 7 is a schematic diagram of an embodiment of a fuel cell system.

In other embodiments, fuel source 24 and emission control system 28 can be integrated into a modular system. FIG. 7 shows a fuel cell system 82 having a modular system 84 configured to engage with a fuel cell stack 86. Other components of fuel cell system 82 similar to the components of system 20 are designated with the same reference numbers. Modular system 84 includes a fuel source 88 having an outlet 90, such as a liquid methanol tank, and an emission control system 92 having an inlet 94 and an outlet 96. Emission control system 92 can be a packed bed tube, can be a catalytic converter-type device, or include a corrugated substrate, as described above. Modular system 84 is configured to engage with stack 86 such that outlet 90 engages with anode inlet 34, and inlet 94 engages with anode outlet 36. Thus, as a modular system is replaced, e.g., to provide a new fuel source, the emission control system can also be replaced.

Still other methods of controlling organic emissions are possible. In some embodiments, the fuel cell systems described herein includes a mechanism that reduces (e.g., eliminates air flow into the fuel cell stack when the fuel cell stack is off (i.e., no load is drawn from the stack). In some cases, when the fuel cell stack is off, air can freely flow to and from the cathode (e.g., through inlet 38 and/or outlet 40) and the anode (e.g., through outlet 36). If there is methanol on the anode side of the fuel cell stack, and/or methanol flowing across the electrolyte to the cathode (e.g., as a parasitic crossover), the methanol is capable of reacting with oxygen (from the air), thereby possibly forming partial oxidation products (such as formaldehyde and/or formic acid). If there is open air access to the fuel cell stack, then there is no limit to the availability of oxygen that can react with the methanol when the stack is off. The partial oxidation products (as well as the methanol) can be released to the environment. In addition, any partial oxidation products that were formed when the stack was on can freely diffuse into the environment, e.g., through cathode inlet 38.

In some embodiments, the fuel cell system includes one or more mechanisms interfaced with cathode inlet 38, cathode outlet 40, and/or anode outlet 36 configured to reduce air flow to the fuel cell stack. The mechanism can be, for example, a pressure-sensitive valve extending across an inlet or an outlet, such as a slit valve made from a polymer membrane, or a pop-up valve. Pressure-sensitive valves are described, for example, in U.S. Ser. No. 10/236,126, filed Sep. 6, 2002. The mechanism can be gravity-driven flap that extends across an inlet or an outlet. The mechanism can include an electromechanical valve, or a mechanical valve, such as a manually operated latch or valve.

Figure 8A:
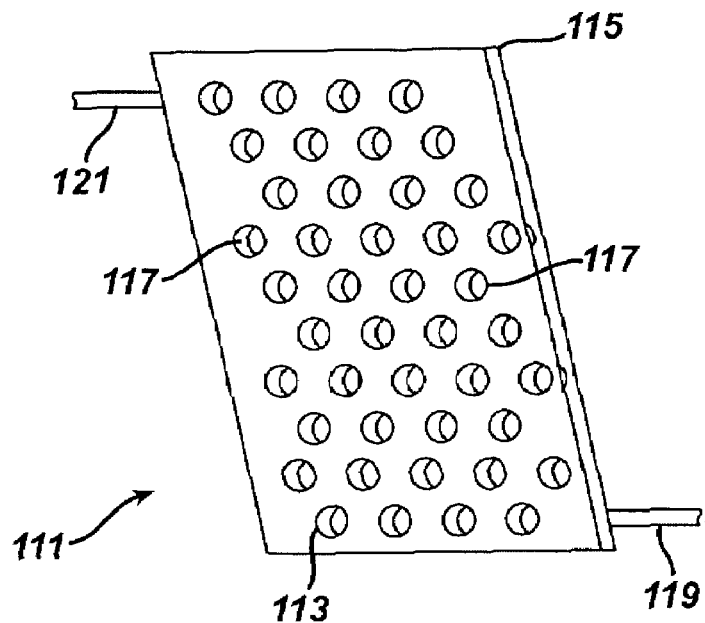
FIGS. 8A and 8B are schematic diagrams of an embodiment of a latching mechanism in an open position and in a closed position, respectively.
Figure 8B:
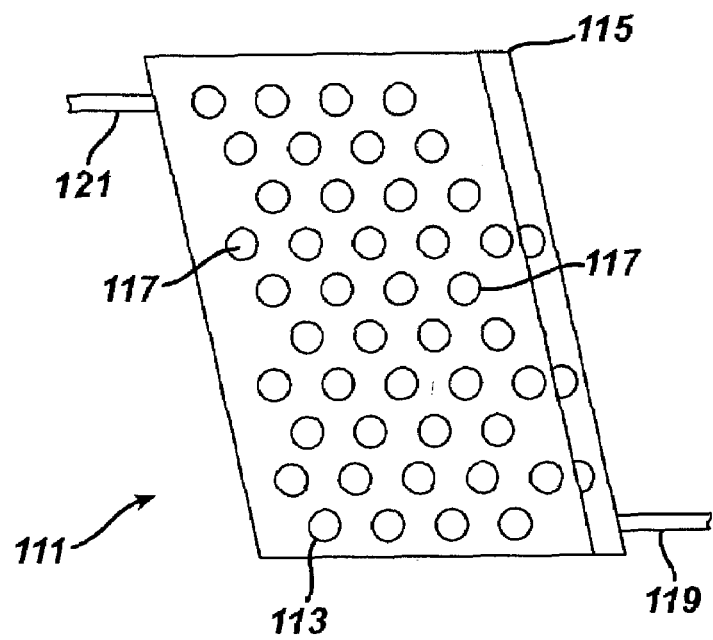

Another mechanism includes a dual latching mechanism using a shape memory material, such as NITINOL™ (a nickel-titanium alloy) or other materials that change dimensionally upon application of current. Referring to FIGS. 8A and 8B, a latching mechanism 111 includes a fixed cover plate 113, a movable cover plate 115, a first wire 119 connected to the movable plate, and a second wire 121 connected to the movable plate. Plate 113 and 115 are configured to be placed across a fuel stack inlet or outlet to allow or to limit gas flow (e.g., air flow). More specifically, plates 113 and 115 include openings 117 that, depending on the position of movable plate 115, are aligned or misaligned. When openings 117 are aligned, air can pass through plates 113 and 115 (FIG. 8A); and when the openings are misaligned, air flow is reduced or eliminated (FIG. 8B).

Wires 119 and 121, such as two NITINOL™ wires positioned in parallel along the short axis of movable plate 115, are configured to move the movable plate to a selected position. For example, wire 119 can be connected to electrical leads (not shown) such that upon flow of current (which heats the wire), the wire changes dimensionally (e.g., contracts or expands) to move plate 115 and align openings 117, thereby allowing gas flow. Mechanism 111 can include a latch to hold plate 115 and/or wire 119 in place. Similarly, wire 121 can be connected to electrical leads (not shown) such that upon flow of current, the wire changes dimensionally (and overcome the latch, if applicable) to move plate 115 and misalign openings 117, thereby reducing gas flow. Mechanism 111 can be interfaced to a fuel cell system to operate according to the operation of the fuel cell system. The current can be provided by the fuel cell, a rechargeable battery (e.g., configured with the fuel cell as a hybrid power source), or a small primary battery in the fuel cell or the fuel cartridge.

Figure 9:
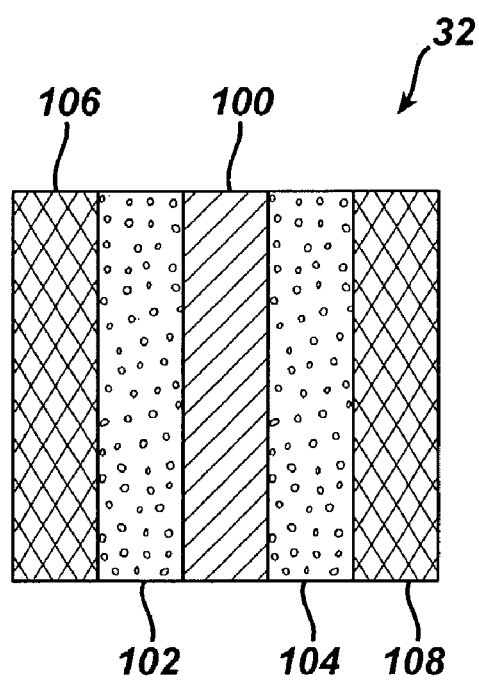
FIG. 9 is a schematic diagram of an embodiment of a fuel cell.

An example of fuel cell 32 will now be described. Referring to FIG. 9, fuel cell 32 includes an electrolyte 100, an anode 102 bonded on a first side of the electrolyte, and a cathode 104 bonded on a second side of the electrolyte. Electrolyte 100, anode 102, and cathode 104 are disposed between two gas diffusion layers (GDLs) 106 and 108.

Electrolyte 100 should be capable of allowing ions to flow therethrough while providing a substantial resistance to the flow of electrons. In some embodiments, electrolyte 100 is a solid polymer (e.g., a solid polymer ion exchange membrane), such as a solid polymer proton exchange membrane (e.g., a solid polymer containing sulfonic acid groups). Such membranes are commercially available from E. I. DuPont de Nemours Company (Wilmington, Del.) under the trademark NAFION. Alternatively, electrolyte 100 can also be prepared from the commercial product GORE-SELECT, available from W. L. Gore & Associates (Elkton, Md.).

Anode 102 can be formed of a material, such as a catalyst, capable of interacting with methanol and water to form carbon dioxide, protons and electrons. Examples of such materials include, for example, platinum, platinum alloys (such as Pt—Ru, Pt—Mo, Pt—W, or Pt—Sn), platinum dispersed on carbon black. Anode 102 can further include an electrolyte, such as an ionomeric material, e.g., NAFION, that allows the anode to conduct protons. Alternatively, a suspension is applied to the surfaces of gas diffusion layers (described below) that face solid electrolyte 100, and the suspension is then dried. The method of preparing anode 102 may further include the use of pressure and temperature to achieve bonding.

Cathode 104 can be formed of a material, such as a catalyst, capable of interacting with oxygen, electrons and protons to form water. Examples of such materials include, for example, platinum, platinum alloys (such as Pt—Co, Pt—Cr, or Pt—Fe) and noble metals dispersed on carbon black. Cathode 104 can further include an electrolyte, such as an ionomeric material, e.g., NAFION, that allows the cathode to conduct protons. Cathode 104 can be prepared as described above with respect to anode 102.

Gas diffusion layers (GDLs) 106 and 108 can be formed of a material that is both gas and liquid permeable. Suitable GDLs are available from various companies such as Etek in Natick, MA, SGL in Valencia, Calif., and Zoltek in St. Louis, Mo. GDLs 106 and 108 can be electrically conductive so that electrons can flow from anode 102 to an anode flow field plate (not shown) and from a cathode flow field plate (not shown) to cathode 104.

In some embodiments, gas diffusion layers 106 and/or 108 includes a material, such as a chemical catalyst, capable of decreasing emission gases, e.g., under operating conditions of a fuel cell system. For example, the material can catalyze oxidation of formaldehyde, formic acid, and/or methanol. Gas diffusion layer 106 next to anode 102 can include materials that can catalyze oxidation of formaldehyde and/or formic acid, such as platinum, palladium, ruthenium, osmium, nickel, silver, gold, copper, iron, chromium, cobalt, manganese, titanium, and/or iridium, loaded on the material of the GDL. Gas diffusion layer 108 next to cathode 104 can include materials that can catalyze oxidation of formaldehyde, methanol, and/or formic acid, such as oxides of the metals listed above (e.g., platinum oxide, ruthenium oxide, manganese oxide, or chromium oxide) loaded on the material of the GDL. In some embodiments, GDLs 106 and 108 are loaded with the material at less than about 0.1 $mg/cm^2$, such as less than 0.09 $mg/cm^2$, less than 0.07 $mg/cm^2$, less than 0.05 $mg/cm^2$, less than 0.03 $mg/cm^2$, or less than 0.01 $mg/cm^2$.

Other embodiments of direct methanol fuel cells and fuel cell systems are described, for example, in "Fuel Cell Systems Explained", J. Laraminie, A. Dicks, Wiley, New York, 2000; "Direct Methanol Fuel Cells: From a Twentieth Century Electrochemist's Dream to a Twenty-first Century Emerging Technology", C. Lamy, J. Leger, S. Srinivasan, Modem Aspects of Electrochemistry, No. 34, edited by J. Bockris et al., Kluwer Academic/Plenum Publishers, New York (2001) pp. 53–118; and "Development of a Miniature Fuel Cell for Portable Applications", S. R. Narayanan, T. I. Valdez and F. Clara, in Direct Methanol Fuel Cells, S. R. Narayanan, S. Gottesfeld and T. Zawodzinski, Editors, Electrochemical Society Proceedings, 2001–4 (2001) Pennington, N.J., all hereby incorporated by reference.

In other embodiments, other fuels can be used, such as other alcohols (e.g., ethanol), hydrocarbons (e.g., propane or butane), or mixtures thereof, including aqueous solutions thereof.

In some embodiments, more than one emission control systems can be used along an outlet 36 and/or 40. For example, anode outlet 36 can include two emission control systems: the first system can reduce the amount of formaldehyde, and the second system can reduce the amount of formic acid. The emission control systems used can be any of the embodiments described above, in any combination.

Stack 22 can be a "strip cell stack" or a stack having a laterally-connected series of fuel cells.

All references, such as patent applications, publications, and patents, referred to herein are incorporated by reference in their entirety.

Other embodiments are in the claims.

What is claimed is:

1. A fuel cell system, comprising:
    an outlet;
    a fuel cell stack in fluid communication with the outlet;
    an organic fuel in fluid communication with the fuel cell stack; and an emission control system in fluid communication with the outlet, the control system capable of reducing an amount of an organic emission from the outlet by absorption, adsorption, catalysis and/or chemical reaction with the emission, wherein the fuel cell system is a direct methanol fuel cell system.

2. The system of claim 1, wherein the organic emission is selected from the group consisting of methanol, formic acid, and formaldehyde.

3. The system of claim 1, wherein the outlet is an anode outlet.

4. The system of claim 1, wherein the outlet is a cathode outlet.

5. The system of claim 1, wherein the emission control system comprises a packed bed.

6. The system of claim 5, wherein the packed bed includes a material is selected from the group consisting of activated carbon, potassium permanganate, elumine, and lanthanum oxide.

7. The system of claim 1, wherein the emission control system comprises a substrate and a first material dispersed on the substrate, the first material capable of reducing the amount of the organic emission.

8. The system of claim 7, wherein the first material is selected from the group consisting of activated carbon, potassium permanganate, elumine, and lanthanum oxide.

9. The system of claim 1, wherein the organic fuel and the emission control system are components of a modular system.

10. The system of claim 1, further comprising a mechanism adapted to restrict gas flow to the fuel cell stack.

11. The system of claim 10, wherein the mechanism comprises a pressure-sensitive valve.

12. The system of claim 11, wherein the pressure-sensitive valve comprises a slit valve.

13. The system of claim 10, wherein the mechanism comprises a shape memory material.

14. The system of claim 10, wherein the mechanism is adapted to restrict gas flow through the outlet.

15. The system of claim 10, wherein the mechanism is adapted to restrict gas flow through an inlet in fluid communication with the fuel cell stack.

16. The system of claim 1, wherein the organic fuel comprises an alcohol.

17. The system of claim 16, wherein the alcohol comprises methanol.

18. The system of claim 1, wherein the fuel cell stack comprises a fuel cell having a gas diffusion layer having a first material capable of reducing an amount of the organic emission that contacts the first material.

19. The system of claim 18, wherein the first material is selected from the group consisting of platinum, palladium, ruthenium, osmium, and iridium.

20. The system of claim 18, wherein the first material comprises an oxide.

21. A fuel cell system, comprising a fuel cell including a cathode, an anode, and a gas diffusion layer different from the cathode and the anode, the gas diffusion layer having dispersed therein a first material capable of reducing an amount of an organic emission that contacts the first material.

22. The system of claim 21, wherein the first material is dispersed in the gas diffusion layer at less than about 0.1 $mg/cm^2$.

23. The system of claim 21, wherein the first material is dispersed in the gas diffusion layer at less than about 0.05 $mg/cm^2$.

24. The system of claim 21, wherein the first material is dispersed in the gas diffusion layer at less than about 0.01 $mg/cm^2$.

25. The system of claim 21, wherein the first material is selected from the group consisting of platinum, palladium, ruthenium, osmium, and iridium.

26. The system of claim 21, wherein the first material comprises an oxide.

27. The system of claim 26, wherein the oxide is selected from the group consisting of platinum oxide, ruthenium oxide, manganese oxide, and chromium oxide.

28. The system of claim 21, wherein the organic emission is selected from the group consisting of methanol, formic acid, and formaldehyde.

29. A method of operating a fuel cell system, the method comprising:

contacting an organic fuel to a catalyst of a fuel cell in the fuel cell system; and reducing an amount of an organic emission from an outlet of the fuel cell system by absorption, adsorption, catalysis, and/or chemical reaction with the organic emission, wherein the fuel cell system is a direct methanol fuel cell system.

30. The method of claim 29, wherein the organic emission is selected from the group consisting of methanol, formic acid, and formaldehyde.

31. The method of claim 29, comprising contacting emission from the outlet with a first material capable of reducing an amount of methanol from the outlet.

32. The method of claim 31, wherein the first material comprises carbon.

33. The method of claim 29, comprising contacting emission from the outlet with a first material capable of reducing an amount of formic acid from the outlet.

34. The method of claim 33, wherein the first material comprises lanthanum oxide or carbon.

35. The method of claim 29, comprising contacting emission from the outlet with a first material capable of reducing an amount of formaldehyde from the outlet.

36. The method of claim 35, wherein the first material comprises potassium permanganate or elumine.

37. The method of claim 29, wherein the organic fuel comprises an alcohol.

38. The method of claim 37, wherein the alcohol comprises methanol.

39. The method of claim 29, wherein the outlet is an anode outlet.

40. The method of claim 30, wherein emission from the anode outlet comprises methanol, and further comprising introducing the methanol from the anode outlet to the fuel cell.

41. The method of claim 29, wherein the outlet is a cathode outlet.

42. The method of claim 29, further comprising contacting the organic emission with a first material dispersed in a gas diffusion layer of the fuel cell, the first material capable of reducing an amount of the organic emission.

43. The method of claim 42, wherein the first material is selected from the group consisting of platinum, palladium, ruthenium, osmium, and iridium.

44. The system of claim 42, wherein the first material comprises an oxide.

* * * * *